US011967133B2

(12) United States Patent
Dey et al.

(10) Patent No.: US 11,967,133 B2
(45) Date of Patent: Apr. 23, 2024

(54) INTEGRATED DEEP LEARNING MODEL FOR CO-OPERATIVE AND CASCADED INFERENCE ON EDGE UTILIZING CLASSIFIERS FOR INPUT IMAGES

(71) Applicant: Tata Consultancy Services Limited, Mumbai (IN)

(72) Inventors: Swarnava Dey, Kolkata (IN); Jayeeta Mondal, Kolkata (IN); Jeet Dutta, Kolkata (IN); Arpan Pal, Kolkata (IN); Arijit Mukherjee, Kolkata (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 387 days.

(21) Appl. No.: 17/450,602

(22) Filed: Oct. 12, 2021

(65) Prior Publication Data

US 2022/0375199 A1 Nov. 24, 2022

(30) Foreign Application Priority Data

Mar. 26, 2021 (IN) .............................. 202121013546

(51) Int. Cl.
*G06V 10/00* (2022.01)
*G06V 10/44* (2022.01)
(Continued)

(52) U.S. Cl.
CPC .......... *G06V 10/764* (2022.01); *G06V 10/454* (2022.01); *G06V 10/82* (2022.01)

(58) Field of Classification Search
CPC .... G06V 10/764; G06V 10/454; G06V 10/82; G06V 10/776; G06V 10/95; G06V 20/52;
(Continued)

(56) References Cited

U.S. PATENT DOCUMENTS

2019/0258878 A1* 8/2019 Koivisto ................. G01S 7/417
2020/0303060 A1* 9/2020 Haemel .................. G06N 3/082
(Continued)

OTHER PUBLICATIONS

Pu Li et al., "Image fire detection algorithms based on convolutional neural networks," Case Studies in Thermal Engineering, Jun. 2020, vol. 19, Elsevier, https://reader.elsevier.com/reader/sd/pii/S2214157X2030085X?token=6620B39A8C9445139DE733D83F3D7A6C96971EE83A15BE6CF5014F73FE032622628719A64FDB646CA304BA5682D28130&originRegion=eu-west-1&originCreation=20210817104436.
(Continued)

*Primary Examiner* — Pakee Fang
(74) *Attorney, Agent, or Firm* — FINNEGAN, HENDERSON, FARABOW, GARRETT & DUNNER LLP

(57) ABSTRACT

Embodiments of the present disclosure provide a method and system for co-operative and cascaded inference on the edge device using an integrated Deep Learning (DL) model for object detection and localization, which comprises a strong classifier trained on largely available datasets and a weak localizer trained on scarcely available datasets, and work in coordination to first detect object (fire) in every input frame using the classifier, and then trigger a localizer only for the frames that are classified as fire frames. The classifier and the localizer of the integrated DL model are jointly trained using Multitask Learning approach. Works in literature hardly address the technical challenge of embedding such integrated DL model to be deployed on edge devices. The method provides an optimal hardware software partitioning approach for components or segments of the integrated DL model which achieves a tradeoff between latency and accuracy in object classification and localization.

18 Claims, 17 Drawing Sheets

(51) Int. Cl.
*G06V 10/764* (2022.01)
*G06V 10/82* (2022.01)

(58) Field of Classification Search
CPC ........ G06V 20/17; G06N 3/045; G06N 3/063; G06N 3/082
See application file for complete search history.

(56) References Cited

U.S. PATENT DOCUMENTS

| | | | | |
|---|---|---|---|---|
| 2021/0035313 | A1* | 2/2021 | Ghadyali | G06T 7/246 |
| 2023/0274422 | A1* | 8/2023 | Peleg | G16H 30/40 |
| | | | | 382/128 |

OTHER PUBLICATIONS

Tianyi Ma et al., "Neural Network Optimization for Hardware-Software Partitioning", First International Conference on Innovative Computing, Information and Control, Sep. 2006, vol. I, IEEE, https://ieeexplore.ieee.org/document/1692204.

Haytham Azmi et al., "FPGA-based Implementation of a Tree-based Classifier using HW-SW Co-design," 2019 6th International Conference on Advanced Control Circuits and Systems, Nov. 2019, IEEE, https://ieeexplore.ieee.org/document/9062867.

Weiwen Jiang et al., Hardware/Software Co-Exploration of NeuralArchitectures Title of the item: Transactions on Computer-Aided Design of Integrated Circuits and Systems, Dec. 2020, vol. 39, Issue: 12, pp. 4805-4815, IEEE, https://arxiv.org/pdf/1907.04650.pdf.

Zhang Q, "Deep convolutional neural networks for forest fire detection," International Forum on Management, Education and Information Technology Application (IFMEITA 2016), 2016, Atlantis Press, https://www.atlantis-press.com/proceedings/ifmeita-16/25850411.

Muhammad K, "Early fire detection using convolutional neural networks during surveillance for effective disaster management," Neurocomputing, May 2018, vol. 288, pp. 30-42, Elsevier, https://khan-muhammad.github.io/public/papers/Neurocomputing_Fire.pdf.

Muhammad K et a., "Efficient deep CNN-based fire detection and localization in video surveillance applications," Neurocomputing, Jul. 2019, vol. 49, Issue: 7, pp. 1419-1434, IEEE, https://khan-muhammad.github.io/public/papers/IEEE_TSMC_Fire_2018.pdf.

* cited by examiner

200 building, an integrated DL model for an edge device by stitching a first subsequence of layers of a classifier to a DL model, wherein the DL model comprises a second subsequence of layers corresponding to a shared feature extractor and a localizer, ⟵ 202 wherein the first subsequence of layers and the second subsequence of layers are split based on a a) Host Processing Elements (HPE) comprising a first processing element type and b) a Guest Processing Elements (GPE) comprising a second processing element type, wherein the second subsequence of layers corresponding to the shared feature extractor are executed in the GPE providing low latency at cost of reduced accuracy , and the second subsequence of layers corresponding to the localizer and the first subsequence of layers corresponding to the classifier are executed in the HPE, wherein the shared feature extractor a) extract features from an input image to transform the input image from a spatial domain to a feature space and b) shares the extracted features to the localizer and the classifier, and wherein the localizer is triggered to localize an object in the input image only if the classifier classifies the input image as positive, indicating presence of the object in the input image

training the integrated DL model for a cascaded inference providing a multi-decision output with simultaneous classification and localization of the object on the edge device, wherein training comprises:

performing joint learning of the integrated DL model utilizing a Multitask Learning (MTL) approach, wherein the classifier learns a classification task and the localizer learns a localization task based on an integrated loss function (L) that minimizes a classifier loss function and a localizer loss function in unison using a relative task weight parameter α.

400 fine tuning the initial partition by performing layer wise partitioning of the first set of layers and the second set of layers by:

selecting, freezing and converting the first set of layers identified in the initial partitioning for deploying and executing in the GPE (406a)

re-training the second set of layers without training the first set of layers deployed on the GPE, wherein the second set of layers are retrained using an intermediate output of (i) the first set of layers and (ii) the second set of the layers (406b)

determining a partition point between the first set of layers and the second set of layers (406c) by:

a) exporting a plurality of partition points, and partitioned models based on different subsequences of layers, with a set of resultant accuracy and latency combinations (406d)

b) selecting (i) an optimal configuration of accuracy and latency based on an end application requirement and (ii) a corresponding partition point among the plurality of partition points as the optimal hardware software partitioning (406e)

(a) Fire 95.6%
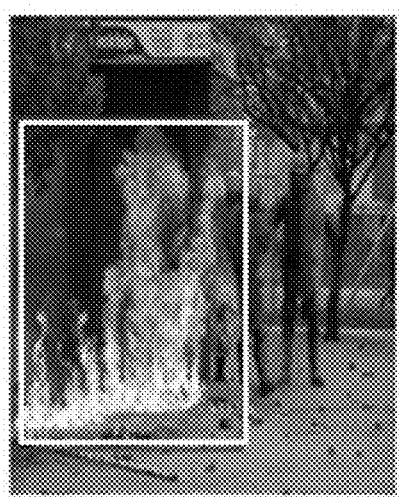
(b) Fire 99.8%
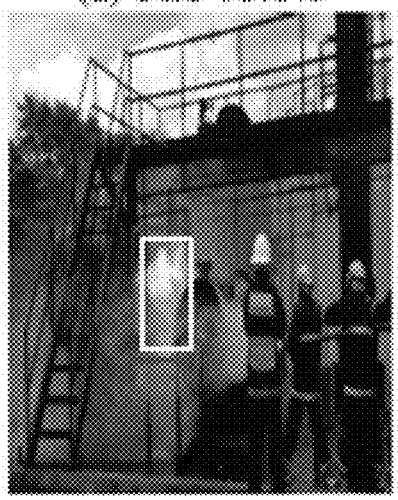
(c) Fire 98.3%
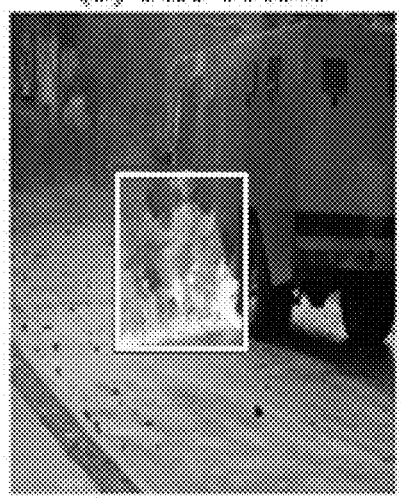
(d) Fire 99.8%
FIG. 7

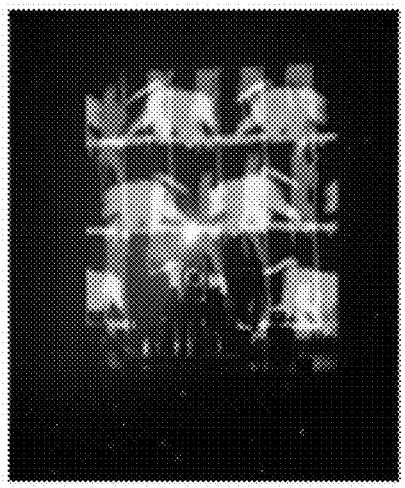
(a) False Positive
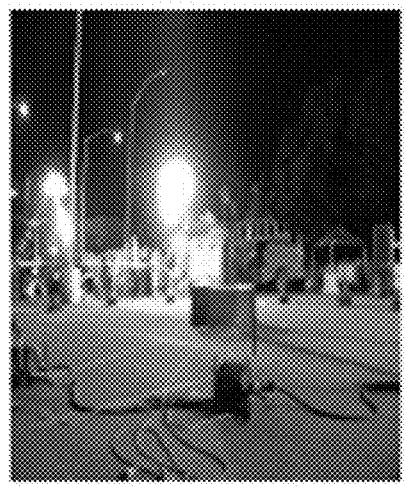
(b) False Negative
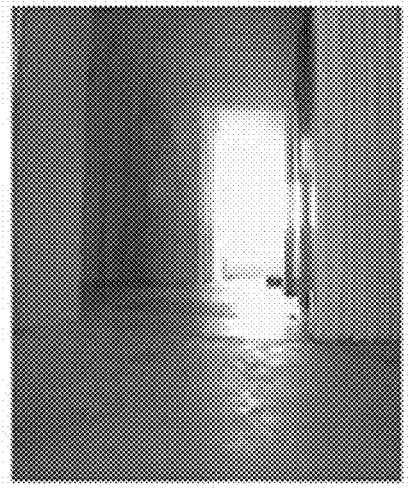
(c) False Negative
FIG. 10

INTEGRATED DEEP LEARNING MODEL FOR CO-OPERATIVE AND CASCADED INFERENCE ON EDGE UTILIZING CLASSIFIERS FOR INPUT IMAGES

PRIORITY CLAIM

This U.S. patent application claims priority under 35 U.S.C. § 119 to: Indian application no. 202121013546, filed on Mar. 26, 2021. The entire contents of the aforementioned application are incorporated herein by reference.

TECHNICAL FIELD

The embodiments herein generally relate to object classification and localization and, more particularly, to a method and system for co-operative and cascaded inference on an edge device using an integrated Deep Learning (DL) model for object classification and localization.

BACKGROUND

Edge computing is critical as end applications demand real time analysis. However, edge devices have resource constraints and processing high speed data such as high frames per second (fps) typically in real time image applications is challenging. Further, with penetration of Neural Network (NN) based processing and analysis for majority of end applications, implementing computation heavy NN models for edge computing is a challenge and light weight NN models are required. Applications such as object detection and localization from a sequence of video frames received, when implemented using the NN models requires multi-tasking, wherein a classifier detects an object while a localizer localizes the object. Implementing two NN models on the resource constrained edge device is a challenge.

Fire detection and localization is a typical example of object (fire) classification and localization. Deep Learning (DL) can be applied to build fire classification models with high accuracy and minimum manual feature engineering, as there are many good fire classification datasets. Unlike fire/no-fire classification (FC) there is a lack of public datasets with annotated fire images (e.g., bounding boxes around fire region) for fire localization (FL). DL based object detection and localization trained on such a small dataset often have high false-negative (failure to detect fire) and false positive (false alarms) rates. Further, achieving a trade-off between latency and accuracy of object detection and localization is a major factor that affects performance of any system for real time applications. This is obvious as applications such as automated fire detection and localization systems need to fast and accurate detection for timely response.

SUMMARY

Embodiments of the present disclosure present technological improvements as solutions to one or more of the above-mentioned technical problems recognized by the inventors in conventional systems.

For example, in one embodiment, a method for co-operative and cascaded inference on an edge device using an integrated Deep Learning (DL) model is provided.

The method includes building an integrated Deep Learning (DL) model for an edge device by stitching a first subsequence of layers of a classifier to a DL model, wherein the DL model comprises a second subsequence of layers corresponding to a shared feature extractor and a localizer. The first subsequence of layers and the second subsequence of layers are split based on a) a Host Processing Elements (HPE) and b) a Guest Processing Elements (GPE). The second subsequence of layers corresponding to the shared feature extractor are executed in the GPE providing low latency at cost of reduced accuracy, and the second subsequence of layers corresponding to the localizer and the first subsequence of layers corresponding to the classifier are executed in the HPE. The shared feature extractor a) extract features from an input image to transform the input image from a spatial domain to a feature space and b) shares the extracted features to the localizer and the classifier. The localizer is triggered to localize an object in the input image only if the classifier classifies the input image as positive, indicating presence of the object in the input image.

The method further comprises training the integrated DL model for a cooperative cascaded inference providing a multi-decision output with simultaneous classification and localization of the object on the edge device. The training comprises performing joint learning of the integrated DL model utilizing a Multitask Learning (MTL) approach, wherein the classifier learns a classification task and the localizer learns a localization task based on an integrated loss function (L) that minimizes a classifier loss function $\mathcal{L}^c$ and a localizer loss function $\mathcal{L}^l$ in unison using a relative task weight parameter α.

Furthermore, the method includes jointly partitioning the first subsequence of layers of the classifier and the second subsequence layers corresponding to the shared feature extractor and the localizer into a) a first set of layers to be implemented in the shared feature extractor and b) a second set of layers to be implemented in the classifier and the localizer by identifying an optimal hardware software partition for implementing the integrated DL model under constraint of minimal frames per second (fps), wherein the optimal hardware software partition enables balance between the latency and the accuracy of the integrated DL model while jointly performing the classification task and the localization task.

In another aspect, a system for co-operative and cascaded inference on an edge device using an integrated Deep Learning (DL) model is provided. The system comprises a memory storing instructions; one or more Input/Output (I/O) interfaces; and one or more hardware processors coupled to the memory via the one or more I/O interfaces, wherein the one or more hardware processors are configured by the instructions to build an integrated Deep Learning (DL) model for an edge device by stitching a first subsequence of layers of a classifier to a DL model, wherein the DL model comprises a second subsequence of layers corresponding to a shared feature extractor and a localizer. The first subsequence of layers and the second subsequence of layers are split based on a) a Host Processing Elements (HPE) comprising a first processing element type and b) a Guest Processing Elements (GPE) comprising a second processing element type. The second subsequence of layers corresponding to the shared feature extractor are executed in the GPE providing low latency at cost of reduced accuracy, and the second subsequence of layers corresponding to the localizer and the first subsequence of layers corresponding to the classifier are executed in the HPE. The shared feature extractor a) extract features from an input image to transform the input image from a spatial domain to a feature space and b) shares the extracted features to the localizer and the classifier. The localizer is triggered to localize an object in the input image only if the classifier classifies the input image as positive, indicating presence of the object in the input image.

The one or more hardware processors are further configured to train the integrated DL model for a cooperative cascaded inference providing a multi-decision output with simultaneous classification and localization of the object on the edge device. The training comprises performing joint learning of the integrated DL model utilizing a Multitask Learning (MTL) approach, wherein the classifier learns a classification task and the localizer learns a localization task based on an integrated loss function (L) that minimizes a classifier loss function $\mathcal{L}^c$ and a localizer loss function $\mathcal{L}^l$ in unison using a relative task weight parameter α.

Further, the one or more hardware processors are further configured to jointly partition the first subsequence of layers of the classifier and the second subsequence layers corresponding to the shared feature extractor and the localizer into a) a first set of layers to be implemented in the shared feature extractor and b) a second set of layers to be implemented in the classifier and the localizer by identifying an optimal hardware software partition for implementing the integrated DL model under constraint of minimal frames per second (fps), wherein the optimal hardware software partition enables balance between the latency and the accuracy of the integrated DL model while jointly performing the classification task and the localization task In yet another aspect, there are provided one or more non-transitory machine-readable information storage mediums comprising one or more instructions, which when executed by one or more hardware processors causes a method for co-operative and cascaded inference on an edge device using an integrated Deep Learning (DL) model.

The method includes building an integrated Deep Learning (DL) model for an edge device by stitching a first subsequence of layers of a classifier to a DL model, wherein the DL model comprises a second subsequence of layers corresponding to a shared feature extractor and a localizer. The first subsequence of layers and the second subsequence of layers are split based on a) a Host Processing Elements (HPE) and b) a Guest Processing Elements (GPE). The second subsequence of layers corresponding to the shared feature extractor are executed in the GPE providing low latency at cost of reduced accuracy, and the second subsequence of layers corresponding to the localizer and the first subsequence of layers corresponding to the classifier are executed in the HPE. The shared feature extractor a) extract features from an input image to transform the input image from a spatial domain to a feature space and b) shares the extracted features to the localizer and the classifier. The localizer is triggered to localize an object in the input image only if the classifier classifies the input image as positive, indicating presence of the object in the input image.

The method further comprises training the integrated DL model for a cooperative cascaded inference providing a multi-decision output with simultaneous classification and localization of the object on the edge device. The training comprises performing joint learning of the integrated DL model utilizing a Multitask Learning (MTL) approach, wherein the classifier learns a classification task and the localizer learns a localization task based on an integrated loss function (L) that minimizes a classifier loss function $\mathcal{L}^c$ and a localizer loss function $\mathcal{L}^l$ in unison using a relative task weight parameter α.

Furthermore, the method includes jointly partitioning the first subsequence of layers of the classifier and the second subsequence layers corresponding to the shared feature extractor and the localizer into a) a first set of layers to be implemented in the shared feature extractor and b) a second set of layers to be implemented in the classifier and the localizer by identifying an optimal hardware software partition for implementing the integrated DL model under constraint of minimal frames per second (fps), wherein the optimal hardware software partition enables balance between the latency and the accuracy of the integrated DL model while jointly performing the classification task and the localization task.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A through 2B (collectively referred as FIG. 2) is a flow diagram illustrating a method for co-operative and cascaded inference on the edge device using the integrated DL model of the system of FIG. 1, in accordance with some embodiments of the present disclosure.

FIG. 4A through 4B (collectively referred as FIG. 4) is a flow diagram illustrating a method for optimal hardware software partitioning of the integrated DL model, using the system of FIG. 1, in accordance with some embodiments of the present disclosure.

FIG. 7 shows results of true positive prediction scores with bounding boxes on sample fire images collected from validation dataset, in accordance with some embodiments of the present disclosure.

FIG. 10 depicts some example images from with false prediction outputs, in accordance with some embodiments of the present disclosure.

Figure 1:
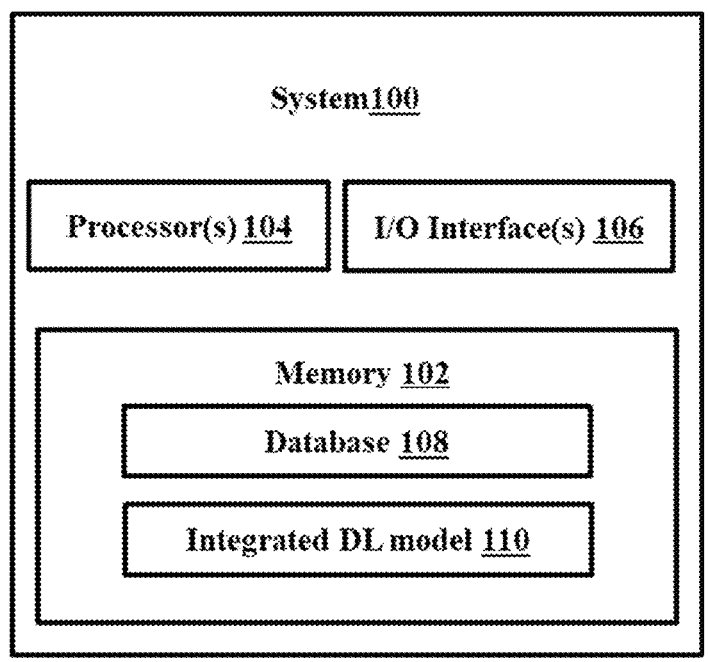
FIG. 1 is a functional block diagram of a system for co-operative and cascaded inference on an edge device using an integrated Deep Learning (DL) model, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In recent past, application of Deep Learning (DL) techniques rendered this tedious job of feature extraction, classification, and localization, yielding better detection accuracy. Specifically, in fire detection and localization, B. Kim, and J. Lee, "A video-based fire detection using deep learning models," trained a Faster Region Based Convolutional Neural Networks (R-CNN) (FasterRCNN) model to detect the fire regions. They improved accuracy in long-term period by leveraging the decision-making process through Long short-term memory (LSTMs), which were used for temporal feature analysis of the detected fire-regions. In order to improve the inference frame rate, Muhammad et al. in "Efficient deep CNN-based fire detection and localization in video surveillance applications," fine-tuned a small CNN model, SqueezeNet for fire classification. The authors calculated the hamming distances between the ground truth and different feature maps (FM) from intermediate layers of DNN model and then applied a threshold to find the maps most sensitive to fire pixels. They localized fire regions by generating binary images from captured ones using those sensitive FM. Hu et al. in "Real-time fire detection based on deep convolutional long-recurrent networks and optical flow method," combined Deep Convolutional Long-Recurrent Network and Optical flow methods for fire detection in outdoor environments. Zhang et al. in "Deep convolutional neural networks for forest fire detection," trained a fine-grained patch classifier with up sampled Pool-5 features of a fine-tuned AlexNet model to detect forest fires. DL based fire detection methods can address that with easily available pre-trained models and high-quality fire classification datasets. However, in pioneering embedded AFDL systems, e.g., Muhammad et al. in "Efficient deep CNN-based fire detection and localization in video surveillance applications," the false positives and negatives could have been reduced by using a better classification model than SqueezeNet. Hardly any works in literature attempt any embedded implementation of the fire localization part, which is important to aid automated firefighting by aligning retardant spraying nozzles etc. at the correct target position.

Embodiments of the present disclosure provide a method and system for co-operative and cascaded inference on the edge device using an integrated DL model for object detection and localization. The method disclosed herein is explained with example of fire detection, interchangeably referred as classification and localization application, however it can be understood by person skilled in the art that the method can be equally applied to any object detection and localization with minimal changes specific to object definition.

The integrated DL model of the system disclosed herein comprises a strong classifier trained on largely available datasets and a weak localizer trained on scarcely available datasets, which work in coordination to first detect fire in every input frame using the classifier, and then trigger a localizer only for the frames that are classified as fire frames. The classifier and the localizer of the integrated DL model are jointly trained using a Multitask Learning (MTL) approach, known in the art. As mentioned above, works in literature hardly address the technical challenge of embedding such integrated DL model, for example a cascaded CNN, to be deployed on edge devices such as drones or the like.

The method provides an optimal hardware software partitioning approach for components or segments of the integrated DL model which achieves a tradeoff between latency (frames per second that can be handled) and accuracy (accurate classification and localization of object in the frames). Thus, the method provides a cooperative cascaded inference on the edge device by a multi-decision output with simultaneous classification and localization of the object.

Referring now to the drawings, and more particularly to FIGS. 1 through 12, where similar reference characters denote corresponding features consistently throughout the figures, there are shown preferred embodiments and these embodiments are described in the context of the following exemplary system and/or method.

FIG. 1 is a functional block diagram of a system 100 for co-operative and cascaded inference on the edge device using an integrated DL model 110 for object detection and localization, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104 comprising a DL model 110. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices and receiving video sequence comprising a plurality of image frames of training datasets for the classifier and the localizer of the integrated DL model 110.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 102 includes a database 108 that stores the training images, cascaded inference of the DL model, input heat images and the like. Further, the memory 102 may include one or more modules such as the integrated DL model 110. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with FIGS. 2 through 12.

FIG. 2A through FIG. 2B (collectively referred as FIG. 2) is a flow diagram illustrating a method 200 for co-operative and cascaded inference on the edge device using an integrated DL model 110 for object detection and localization, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2 and FIG. 4. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the one or more hardware processors 104 build the integrated DL model 100 for an edge device by stitching a first subsequence of layers of a classifier to a DL model, wherein the DL model comprises a second subsequence of layers corresponding to a shared feature extractor and a localizer. The first subsequence of layers and the second subsequence of layers are split based on a) a Host Processing Elements (HPE) comprising a first processing element type and b) a Guest Processing Elements (GPE) comprising a second processing element type. The second subsequence of layers corresponding to the shared feature extractor are executed in the GPE providing low latency at cost of reduced accuracy, and the second subsequence of layers corresponding to the localizer and the first subsequence of layers corresponding to the classifier are executed in the HPE. The shared feature extractor a) extract features from an input image to transform the input image from a spatial domain to a feature space and b) shares the extracted features to the localizer and the classifier. The localizer is triggered to localize an object in the input image only if the classifier classifies the input image as positive, indicating presence of the object in the input image.

Figure 3A:
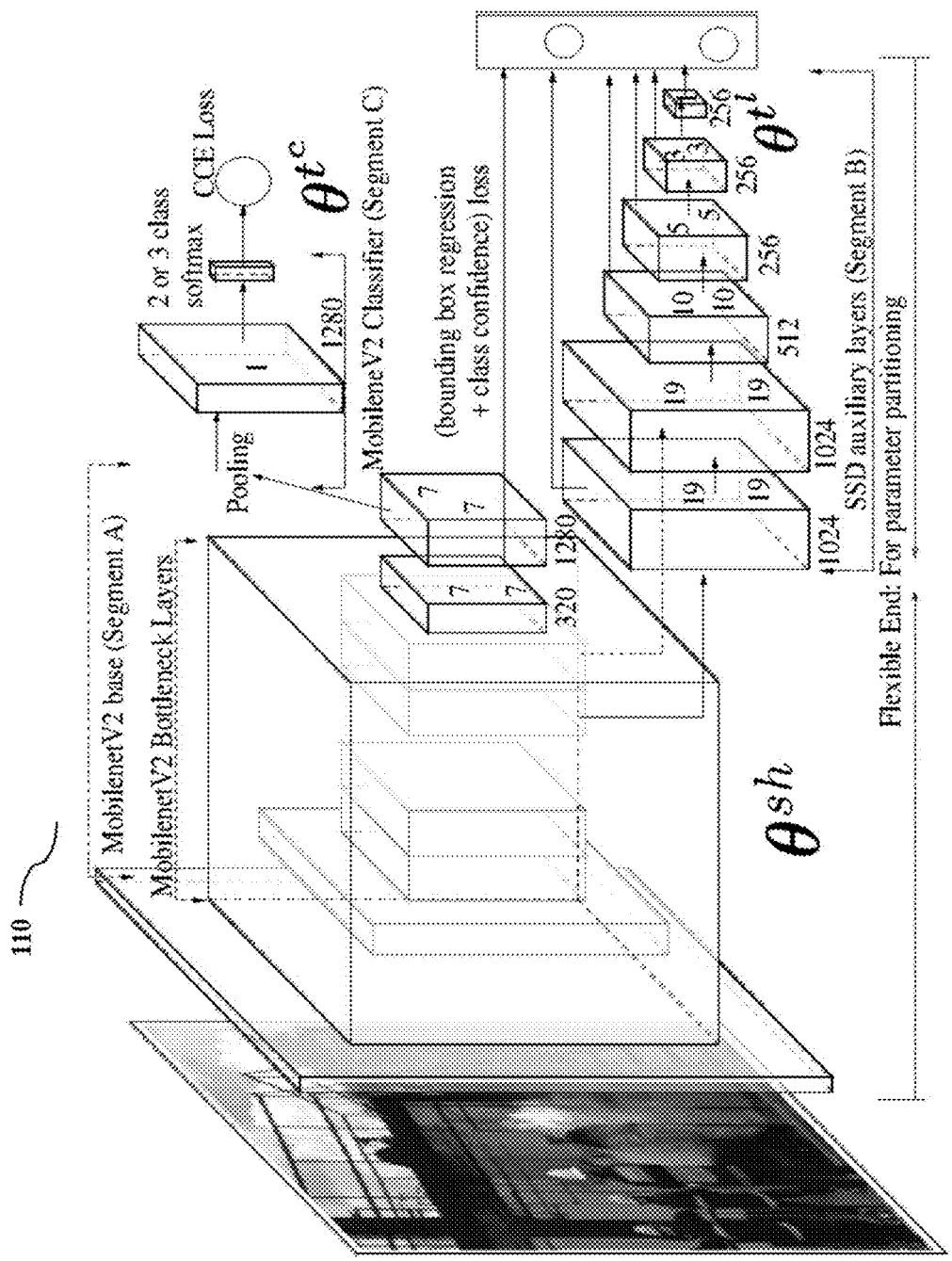
FIG. 3A illustrates an architectural overview of the DL integrated model, in accordance with some embodiments of the present disclosure.
Figure 3B:
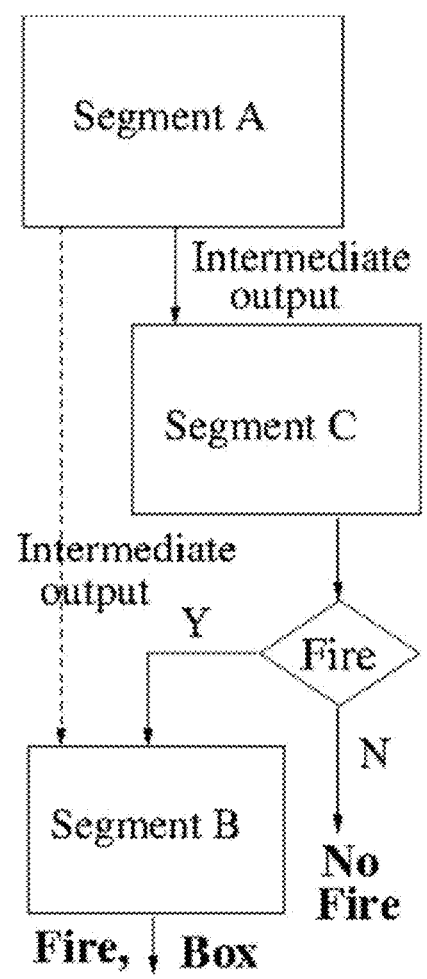
FIG. 3B illustrates a functional flow among components of the DL integrated model, in accordance with some embodiments of the present disclosure.

FIG. 3A illustrates an architectural overview of the DL integrated model, in accordance with some embodiments of the present disclosure and FIG. 3B illustrates a functional flow among components of the DL integrated model, in accordance with some embodiments of the present disclosure. FIG. 3A depicts the architecture for the integrated DL model 110, also referred as to a Cascaded Automated Fire Detection and localization (CAFDL) when the end application is for detection and localization of fire in input images received. The integrated DL model 110 and the CAFDL may be interchangeably used herein after. As depicted in FIG. 3A, in one implementation segment A (the shared feature extractor) and segment B (the localizer) are parts of a standard Single-Shot multi-box Detection (SSD) with MobilenetV2™ as backbone feature extractor (also referred herein as to shared feature extractor). Segment A has an initial 2D convolution resulting in 112×112×32 followed by 17 "bottleneck residual" blocks comprising of a depth-wise convolution, a pointwise convolution, a projection layer, and a residual connection from block input to output. The feature extractor head ends with a 1×1×320 convolution. In the Segment B, the SSD ingests feature maps (FMs) from segment A and detects objects at different scales. The spatial dimensions of convolution layers decrease from left to right in Segment B and hence the image resolutions. From left to right, smaller to larger objects (fires) are detected by using a combination of multi-scale feature maps (FMs) from these convolution layers and a number of default boxes of different dimensions. For each layer, fm_height×fm_width× ($num_{classes}$+4) predictions are made. The object classes are associated with each bounding box. A predicted box is considered to contain an object only if the jaccard overlap between the corresponding default box and ground truth box is greater than a threshold. In SSD this is calculated using Intersection over Union (IoU)>0.5. The method 200 stitches segment C with the above network with the classifier layers from MobilenetV2™.

FIG. 3B depicts the control flow of this architecture during the inference phase. A fire localization (FL) segment or the segment B, alternatively referred as the localizer, is triggered only if fire is detected by a relatively stronger fire classification (FC) or segment C, alternatively referred as to the classifier. In case fire is detected but there are no objects detected in the FL part, the system 100 raises an alarm for the human fire fighter to intervene and adjust camera's pan, tilt, and zoom (PTZ).

Once the integrated DL model is built in accordance with FIGS. 3A and 3B, then at step 204 of the method 200, the one or more hardware processors 104 train the integrated DL model for the cooperative cascaded inference to indicate presence of object in the input image through the multi-decision output with simultaneous classification and localization of the object (for example herein, fire) on the edge device such a as a drone with camera mounted to capture video of a scene under observation. The training comprises performing joint learning of the integrated DL model utilizing the Multitask Learning (MTL) approach, wherein the classifier learns a classification task and the localizer learns a localization task based on an integrated loss function (L) that minimizes a classifier loss function $\mathcal{L}^{t^c}$ and a localizer loss function $\mathcal{L}^{t^l}$ in unison using a relative task weight parameter α. Thus, method disclosed herein enables multi-decision output even with imbalanced dataset for two different decisions, the classification decision and the localization decision. Herein, classification data is available in abundance and hence the classifier is strong, but localization data for training is scarce hence the localizer is weak, still the classification and localization performed simultaneously for multi-decision output by the integrated DL model provides higher accuracy.

Mathematical representation of DL integrated model 110: Let $t^l$ and $t^c$ be the fire localization (FL) and fire classification (FC) task respectively. Segment A is shared and transforms samples from a unified input space X (spatial domain) to an intermediate representation (feature space). This is transformed to an output space $Y^{t^l}$ for localization task $t^l$ by segment B and output space $Y^{t^c}$ for classification task $t^c$ by segment C. For a task t, the above network can be modeled as a mapping $f^t(x; \theta^{sh}, \theta^t): X \rightarrow Y^t$, where $\theta^{sh}$ is the shared network parameter for segment A (shared feature extractor) and $\theta^t$ for specific sibling tasks (the localization task by the localizer and the classification task by the classifier). For the current setting $\{\theta^{t^l}\}$ and $\{\theta^{t^c}\}$ are segment B (FL) and segment C (FC) specific network parameters respectively for functions $f^{t^l}(x; \theta^{sh}, \theta^{t^l})$ and $f^{t^c}(x; \theta^{sh}, \theta^{t^c})$ Training of the integrated DL model: The training is a unified end-to-end training of the functions $f^{t^l}(x; \theta^{sh}, \theta^{t^l})$ and $f^{t^c}(x; \theta^{sh}, \theta^{t^c})$Let, 1) images $x^c$, fire/no-fire label $y^c$ and 2) images $x^l$x$l$, ground truth bounding boxes and corresponding class labels $y^l$ be sampled from the unified training set with $X = \{(, y_1^c), (x_2^c, y_2^c), \ldots, (x_n^c y_n^c), (x_1^l, y_1^l), (x_2^l, y_2^l), \ldots (x_k^l, y_K^l)\}$, where there are M=N+K total pairs. The training objective is minimization of both FC and FL loss in unison, can be formulated as follows:

$$\min_{\theta^{sh}, \theta^{t^l}, \theta^{t^c}} L(\theta^{sh}, \theta^{t^l}, \theta^{t^c}) = \min_{\theta^{sh}, \theta^{t^l}, \theta^{t^c}} (\alpha \mathcal{L}^{t^l}(\theta^{sh}, \theta^{t^l}) + (1-\alpha) \mathcal{L}^{t^c}(\theta^{sh}, \theta^{t^c})) \quad (1)$$

where, $\theta^{sh}$ is a shared neural network parameter corresponding to the shared feature extractor, $\theta^{t^c}$ is the parameter (corresponding to the classification task, $\theta^{t^l}$ is the neural network parameter corresponding to the localization task, α is the relative weight per task, $\mathcal{L}^{t^c}$ is the classifier loss function, and $\mathcal{L}^{t^l}$ is the localizer loss function.

For the current problem at hand, considered are two task specific losses in Eqn. 1, however, in an embodiment this can be easily extended to more than two tasks. The FC specific categorical cross entropy loss for classes fire and no-fire can be expressed as:

$$\mathcal{L}^{t^c} = -\Sigma_{i=1}^{M} v_i^t(y_i^c \log+(f_i^c)+(1-y_i^c)\log(1-f_i^c)) \quad (2)$$

The combined loss of SSD for bounding box location prediction and corresponding object class detection is given by work in literature and is follows:

$$L_{SSD}(x, c, l, g) = \frac{1}{N} L_{conf}(x, c) + \alpha(L_{loc}(x, l, g)) \quad (3)$$

The method 200 utilizes equation (3) and defines FL specific loss as follows:

$$\mathcal{L}^{t^l} = -\Sigma_{i=1}^{M} v_i^t(L_{SSD}(x,c,l,g)) \quad (4)$$

In equation (2) and equation (4) the method 200 utilizes strategy provided by work in literature for training using diverse datasets using a decision variable $v_i^t \in \{0,1\}$. $v_i^t = 1$ denotes that the $i^{th}$ sample from X has a ground truth label associated with it, for task t.

Computation of relative weight α: Another important aspect of the end-to-end training is determining the relative weight α of FC (classifier) and FL (localizer) task while updating the shared parameters. Determining the relative weight α introduced in Equation (1) is non-trivial. In one of the works in literature authors demonstrate that individual tasks fight for model capacity through a brute-force grid-search of parameter space. As the method 200 herein has two tasks, the training process of the method 200 directly utilizes the analytical solution of α from the work in literature. Provided below is dimensional quadratic function of α with an analytical solution:

$$\alpha = \frac{(\nabla_{\theta^{sh}} \mathcal{L}^{t^c} - \nabla_{\theta^{sh}} \mathcal{L}^{t^l})^T \nabla_{\theta^{sh}} \mathcal{L}^{t^c}}{\|\nabla_{\theta^{sh}} \mathcal{L}^{t^l} - \nabla_{\theta^{sh}} \mathcal{L}^{t^c}\|_2^2} \quad (5)$$

A clipped value of α in Eqn. 1 and the gradient update is calculated. A "streaming" stochastic gradient descent (SGD) algorithm of work in the literature is followed. As FL (the localizer) data has scarcity of training data or limited training data in comparison to FC (the classifier) large volume of training data, a standard mini batch SGD may contain very less or no FL samples, rendering the gradient update noisy.

Once trained, the trained integrated DL model 110 deployed on the edge device performs the multi-decision output providing simultaneous classification and localization of an object (for example, fire) in the test images captured by camera mounted on the edge device in real time applications such as automatic fire detection and localization system.

Optimal hardware software partitioning: The method 200 further comprises jointly partitioning the first subsequence of layers corresponding to the classifier, and the second subsequence layers corresponding to the shared feature extractor and the localizer into a) a first set of layers to be implemented in the shared feature extractor and b) a second set of layers to be implemented in the classifier and the localizer by identifying an optimal hardware software partition for implementing the integrated DL model under constraint of minimal frames per second (fps). The optimal hardware software partition enables balance or tradeoff between the latency and the accuracy of the integrated DL model while jointly performing the classification task and the localization task.

Figure 4A:
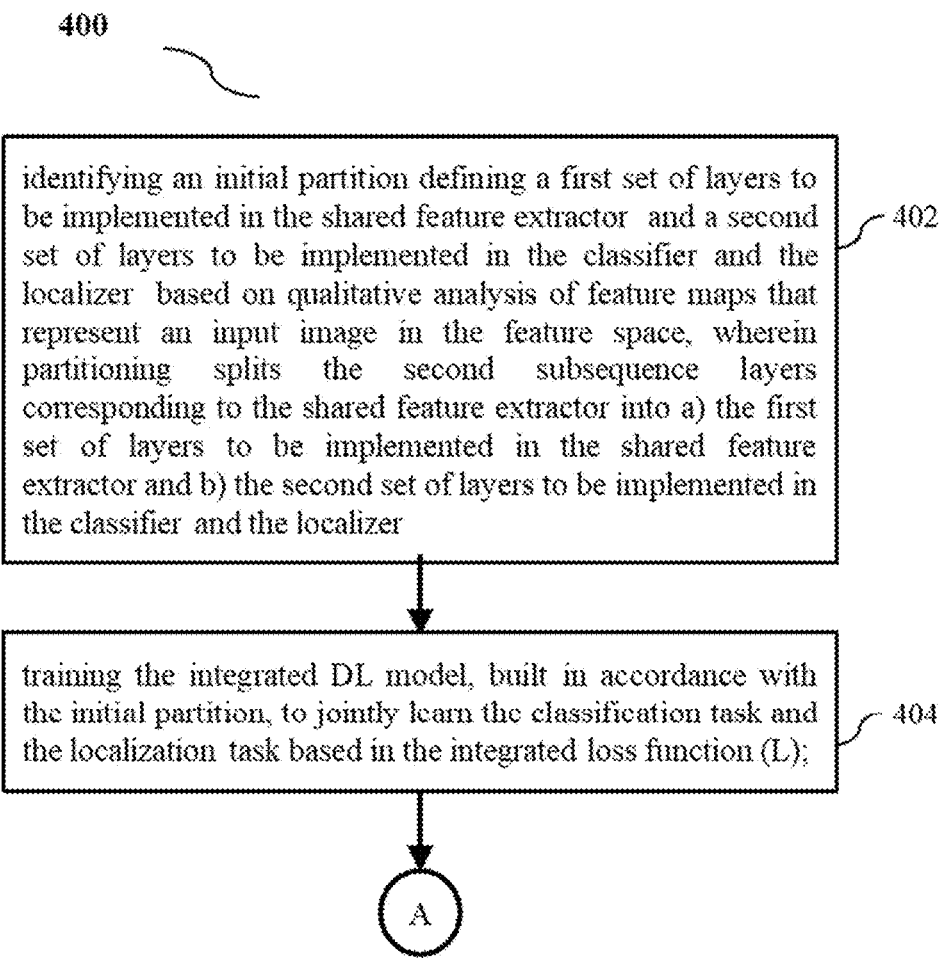
Figure 5A:
FIG. 5A through 5F (collectively referred as FIG. 5) are example input fire images depicting effect of variations of hardware software portioning of the integrated DL model on quality of features maps generated for the input fire images, in accordance with some embodiments of the present disclosure.
Figure 5B:
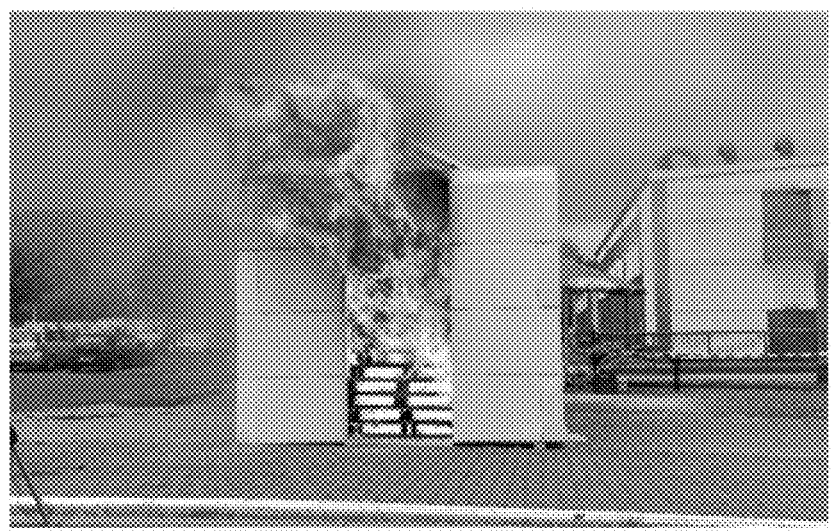
Figure 5C:
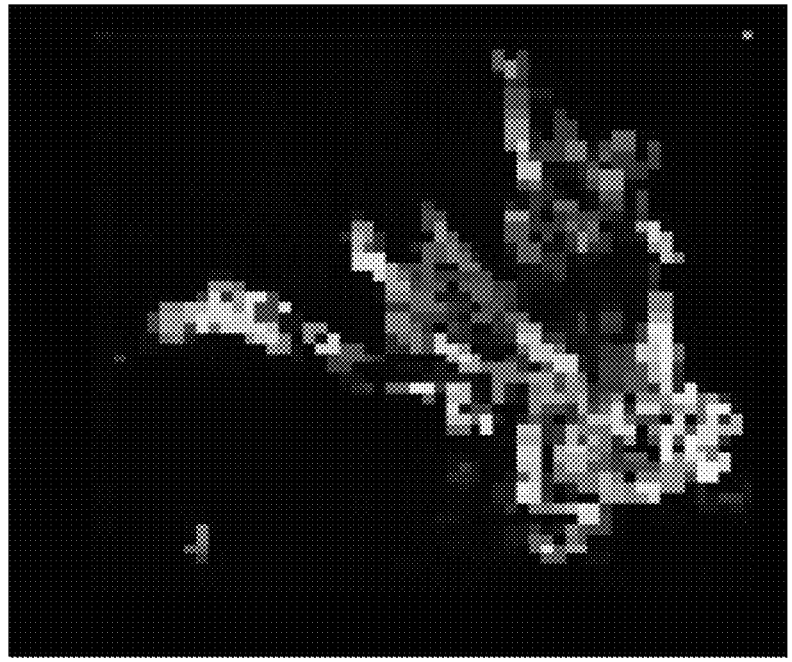
Figure 5D:
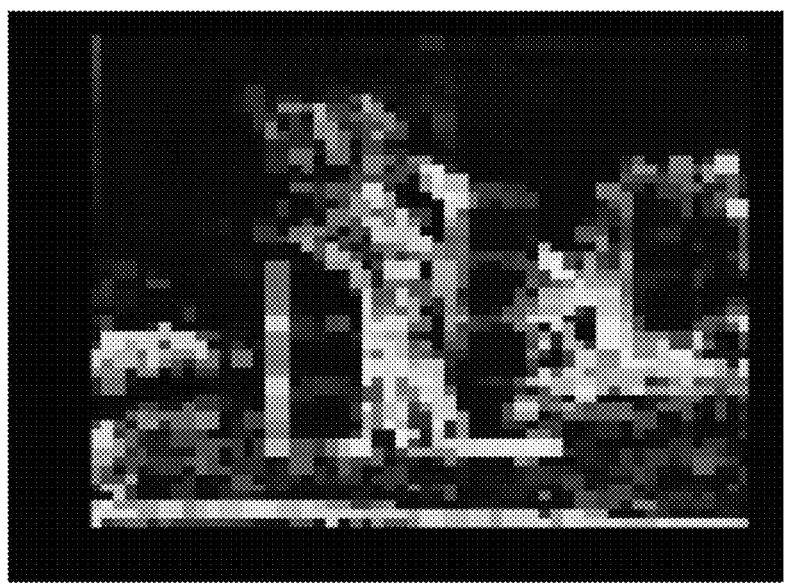
Figure 5E:
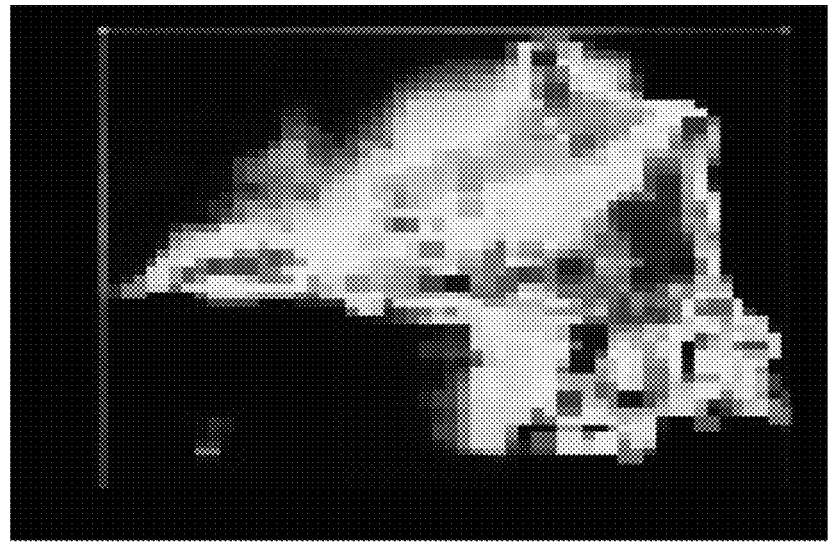
Figure 5F:
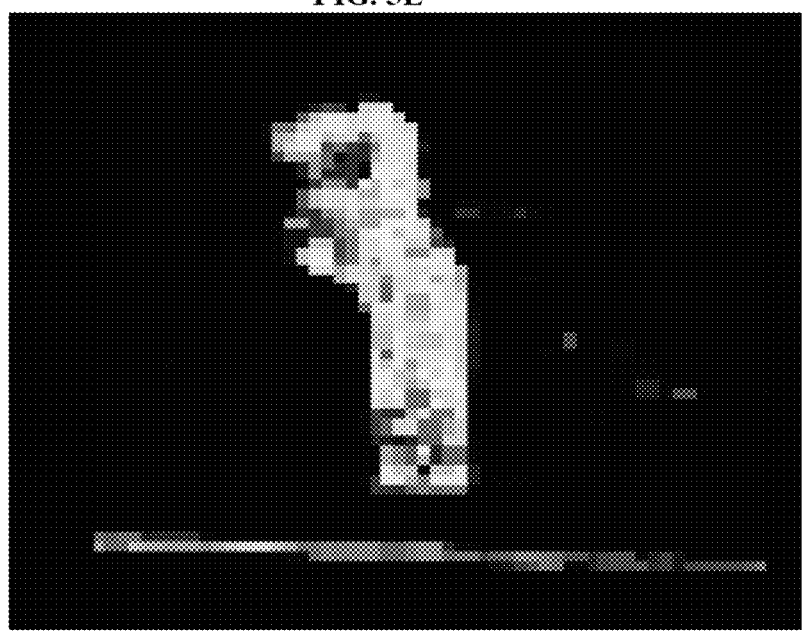

FIG. 4A through 4B (collectively referred as FIG. 4) is a flow diagram illustrating a method 400 for optimal hardware software partitioning of the integrated DL model, using the system of FIG. 1, in accordance with some embodiments of the present disclosure.

In accordance with the method 400, steps of identifying the optimal hardware software partition for jointly partitioning comprises:

A) Identifying (402) an initial partition defining the first set of layers and the second set of layers based on qualitative analysis of feature maps that represent the input image in the feature space.

B) Training (404) the integrated DL model, built in accordance with the initial partition, to jointly learn the classification task and the localization task based in the integrated loss function (L); and C) Fine tuning (406) the initial partition by performing layer wise partitioning of the first set of layers and the second set of layers by:
  a) Selecting, freezing, and converting the first set of layers identified in the initial partitioning for deploying and executing in the GPE (406a).
  b) Re-training the second set of layers without training the first set of layers deployed on the GPE, wherein the second set of layers are retrained using an intermediate output of (i) the first set of layers and (ii) the second set of the layers (406b).
  c) Determining a partition point between the first set of layers and the second set of layers (406c) by:
    exporting a plurality of partition points, and partitioned models based on different subsequences of layers, with a set of resultant accuracy and latency combinations (406d), and
    selecting an (i) an optimal configuration of accuracy and latency based on an end application requirement and (ii) a corresponding partition point among the plurality of partition points as the optimal hardware software partitioning (406e).

The steps a, b, and c above are based on another patent application filed by inventors in India on 29 Jan. 2021 with Application No 202121004213, which refers to a generalized partition mechanism which is slow but can scale to many processing elements. However, in the method disclosed herein the partition is specific to two different types of processing elements (HPE and GPE) providing fast and simple partition approach.

Parameter Sharing and Partitioning for MTL: Determining a hard parameter partition for shared part (segment A) and task specific parts (segment B and C) of FIG. 3B requires understanding of the problem at hand. The method 400 is elaborated where the initial partitioning is identified and finetuned in subsequent steps later. For the current problem, the parameter partitioning considers the effect of hardware acceleration alongside end-to-end latency and accuracy related objectives. The rationale behind is explained below:

1) Need for Hardware Acceleration: In experimental set-up, CAFDL (the integrated DL model 110) provided an average inference rate of 2 frames/second (fps) when run together with all other processes running on the edge device (drone platform). The additional processes on a fully operating drone includes camera (PTZ), handling navigation and SLAM, operating additional sensors and actuators. To achieve a target of 10 fps the shared part of the network (for example the cascaded CNN) is accelerated on Intel Movidius Neural Compute Stick™ (NCS) with the Jetson Nano™ board. However, changing the parameter partition and subsequent acceleration affects both object localization and recognition accuracy as well as end to end execution latency. This is mainly due to the quantization of the shared part using the accelerator SDK™.

2) Initial Partition: For finding the optimal parameter partition a layer-resolution is used. In the experiments conducted layers between the shared and task specific parts in FIG. 3A are moved. The integrated DL model 110 is finetuned on fire images that are very different from the image datasets on base networks are pre-trained (ImageNet™, COCO™). Inclusion of more layers in the shared part and subsequent sometimes fail to generate effective feature maps that are critical for both localization and classification. This is highlighted in earlier literature. In one of the works authors show that with higher spatial resolution for the output feature maps, it is easier to locate sharper boundaries of objects more precisely. This resolution is dependent on three convolution parameters, kernel size, stride value and zero padding. The work in literature highlights that the feature maps of earlier layers retain higher spatial resolution but low-level visual information. In another work in literature authors investigate the effects of semantic information on convolution feature extraction by analyzing the local maxima activations of each feature map and finds that as a primary reason of a stimulus detection in original image. Thus, to reach this initial partition the method 400 the feature maps or FMs, which directly affects the classification performance on fire images. It is identified that the feature map qualities tend to become better as we move some of the layers from segment A of FIG. 3A and replicate that in segment C and segment B. However, the end-to-end latency of the integrated DL model 110 increases due to these additional layers. Image (b) in FIG. 5 shows an original fire image and corresponding change in feature map quality in image (d) of FIG. 5. Further, for image (f), some layers are removed from shared layers (first set of layers) and replicated in the task specific layers (second set of layers). These feature maps are taken from the 10×10×512 layer in the object localization part in FIG. 3A. Image (a) of FIG. 5 shows another original fire image frame, and image (c) and image (e) feature maps show how the quality of the feature map fed to the classifier of segment C of FIG. 3A changes as more layers of segment A of FIG. 3A are included into the accelerator, from left to right. Based on several such iterations it can be decided the shared and task specific parts and end up with the architecture of the DL integrated model 110 of FIG. 3A. Using similar methodology, the start and end layer for the hardware software co-design can be decided.

3) Layer wise Partitioning for Hardware Software Codesign: Once the initial partition is determined multiple model architectures are generated and evaluated based on different parameter partitions. This is an enumeration and search process given in Algorithm 1 below, where the start and end layers are obtained from the initial partition as is point 2) above (step 402).

---

Algorithm 1: Configuration Space Exploration (CSE) for Hardware Software co-design

---

Result: Set of parameter partitions
1 i, start ← starting layer for CSE;
2 end ← ending layer for CSE;
3 k, I ← 0;
4 while i ≤ end do
  5 Freeze and compile layers 0 to i for NCS;
  6 Re-train rest of the model from layers i;
  7 accuracy, mAP, fps← run inference on combined model;
  8 solution_set$_i$← {accuracy, mAP, latency};
  9 i ← i + 1
10 end

---

Figure 6:
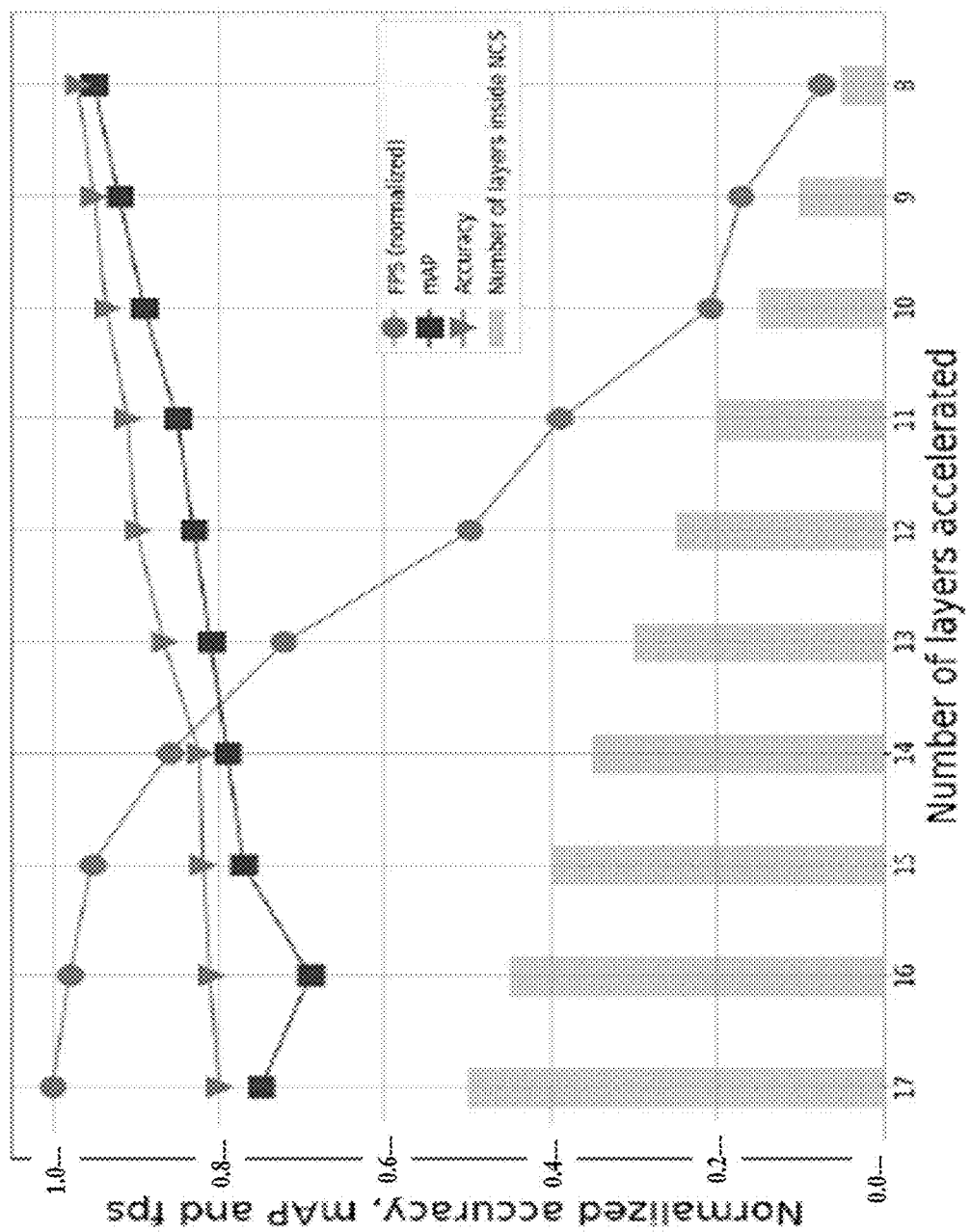
FIG. 6 depicts graphical analysis to determine the optimal hardware software partitioning of the integrated DL model, in accordance with some embodiments of the present disclosure.

A first-round training of the model using the training method is performed as in step 204 and using the datasets. The layer wise partitioning aims to take a layer index and build a frozen hardware accelerated partial model including layer 0 through that layer. In line 5 of algorithm 1 such a model is compiled with NCS SDK™. This part of the model is fixed and not re-trained. In line 6 the full model is fine-tuned using the training method as in step 204, keeping the accelerated part frozen. This gives an effect of quantization aware training as the model adapts to the usage of lower quality feature maps from the accelerated segment. Algorithm 1 generates a set of tuples, where each tuple contains classification accuracy, object detection mAP and frames/second corresponding to a model architecture variant. To select the best configuration from this set a manual intervention is required. As more layers are excluded from the accelerator, the fps value decreases, and the accuracy and mAP increase and vice versa. This is shown in FIG. 6. It is attempted to solve using constraints on minimum fps given by the application and maximizing the co-operative tasks, i.e., accuracy and mAP. Using the above strategy it is observed that the architecture variant with 8 layers accelerated (A-8) gives best accuracy metrics and 14 layers accelerated (A-14) give optimum accuracy-latency tradeoff. The algorithm 1 on an Ubuntu 18.04 workstation with Intel Xeon 32 Core Processor™, 16 GB DRAM and 2 NVIDIA GTX 1080 8 GB GPUs™, with connected NCS USB™ stick. Albeit being an exhaustive search, algorithm 1 saves significant man-hours needed for fine-tuning the classifier, localizer and rebuilding the hardware accelerated part.

Experiments are performed on a combination of 3,326 fire, smoke and normal images collected from standard fire datasets, FiSmo (https://goo.gl/uW7LxW) and Foggia (https://mivia.unisa.it/datasets/video-analysis-datasets/fire-detection-dataset/). The combined dataset comprises of 984 images from FlickrFire-flame, 226 images from BoWFire validation set, 2,116 images from Foggia. Foggia dataset has 29 fire and smoke videos and 2 normal videos. Image frames are captured from these videos at an interval of 2 seconds. To avoid class imbalance, added are non-fire images from videos of Foggia dataset. This is referred as dataset as F-F dataset, as shown in Table I below.

TABLE I

| No. | Dataset | Cat-Fire | Cat-Smoke | Cat-Normal | Total Images |
|---|---|---|---|---|---|
| 1. | FlickrFire | 984 | — | — | 984 |
| 2. | BoWFire | 119 | — | 107 | 226 |
| 3. | Foggia | 133 | 1078 | 905 | 2116 |
| 4. | F-F | 1236 | 1078 | 1012 | 3326 |

The F-F dataset is divided into training, validation and testing set with 40%, 30% and 30% of the total data respectively. It is refrained from putting images from the same Foggia video to any two sets. The classifier is trained and validated it on the 40% train set and 30% validation set of F-F dataset. The remaining 30% of F-F dataset are retrained for testing. For object detector training, 500 images from F-F-train set and 200 images from F-F-val set and test it on 200 images from—test set are manually selected and annotated. For comparing the integrated DL model 110 with previous works, as shown in Table. IV and Table. V, the total data is segregated into two datasets. To compare using test results on Foggia, the Foggia is removed from F-F-train set. On a similar line, BoWFire train data is removed from F-F train set as tests are run on BoWFire validation set. While building the final model for deployment, the complete F-F dataset is used.

TABLE II

| Scenario | Without Drone Processes | | | With drone processes | | |
|---|---|---|---|---|---|---|
| Platforms → Deep Arch ↓ | T × 2 | JN | NCS | T × 2 | JN | NCS |
| MobileNetV2 | 24 | 9 | 54 | 13 | 8 | 54 |
| MobileNetSSD | 18 | 4 | 30 | 10 | 2 | 30 |
| MobileNetV2 + MobileNetSSD | 8 | 1 | — | 2 | X | — |
| Integrated DL model | 20 | 6 | — | 12 | 2 | — |

TABLE III

| Scenario | Without Drone Processes | | | With drone processes | | |
|---|---|---|---|---|---|---|
| Platforms → Deep Arch ↓ | T × 2 | JN | NCS | T × 2 | JN | NCS |
| Feature extractor | 50 | — | — | 50 | — | — |
| Feature extractor + classifier | — | 45 | 40 | — | 30 | 12 |
| Feature extractor + classifier + localizer | — | 24 | 15 | — | 20 | 10 |

Figure 8:
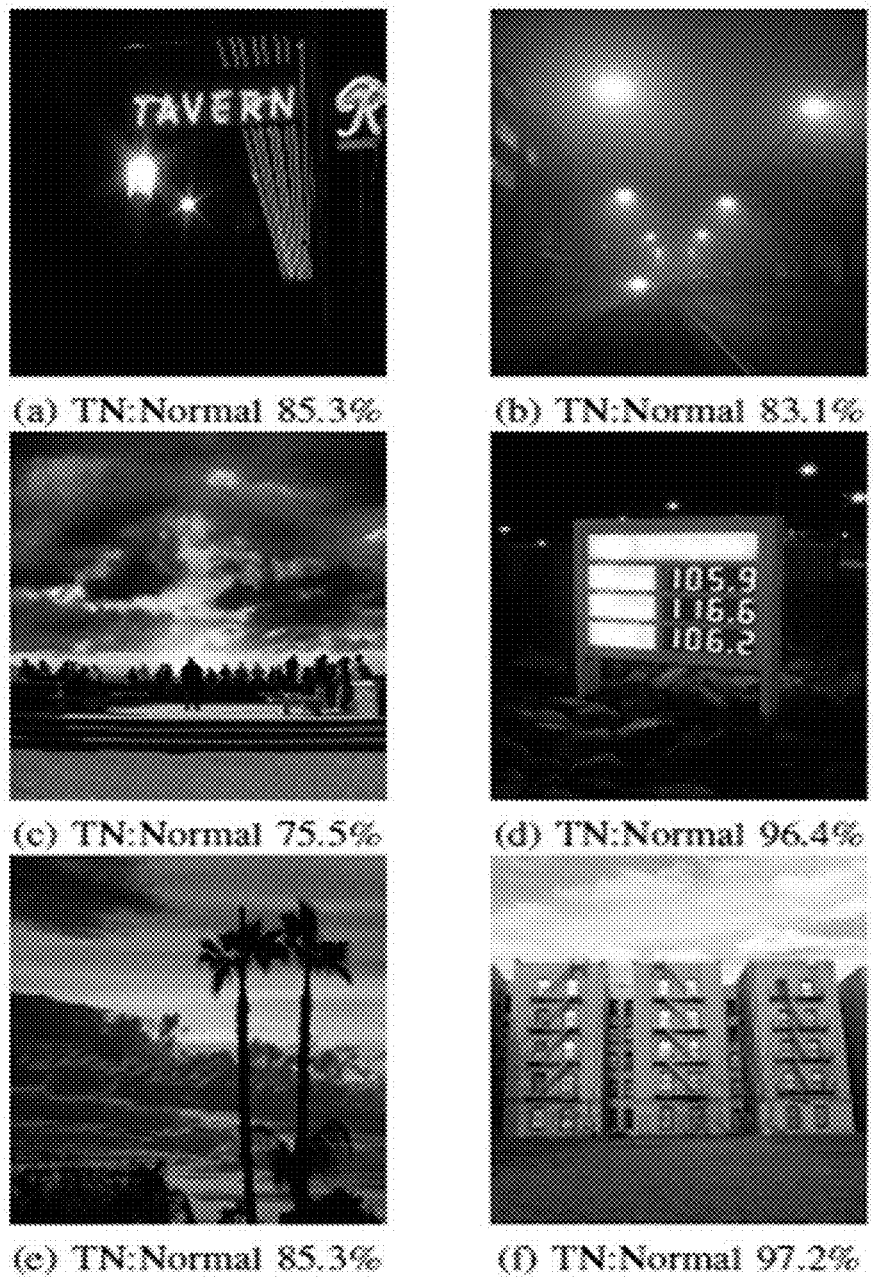
FIG. 8 depicts true negative examples of non-fire images, in accordance with some embodiments of the present disclosure.
Figure 9:
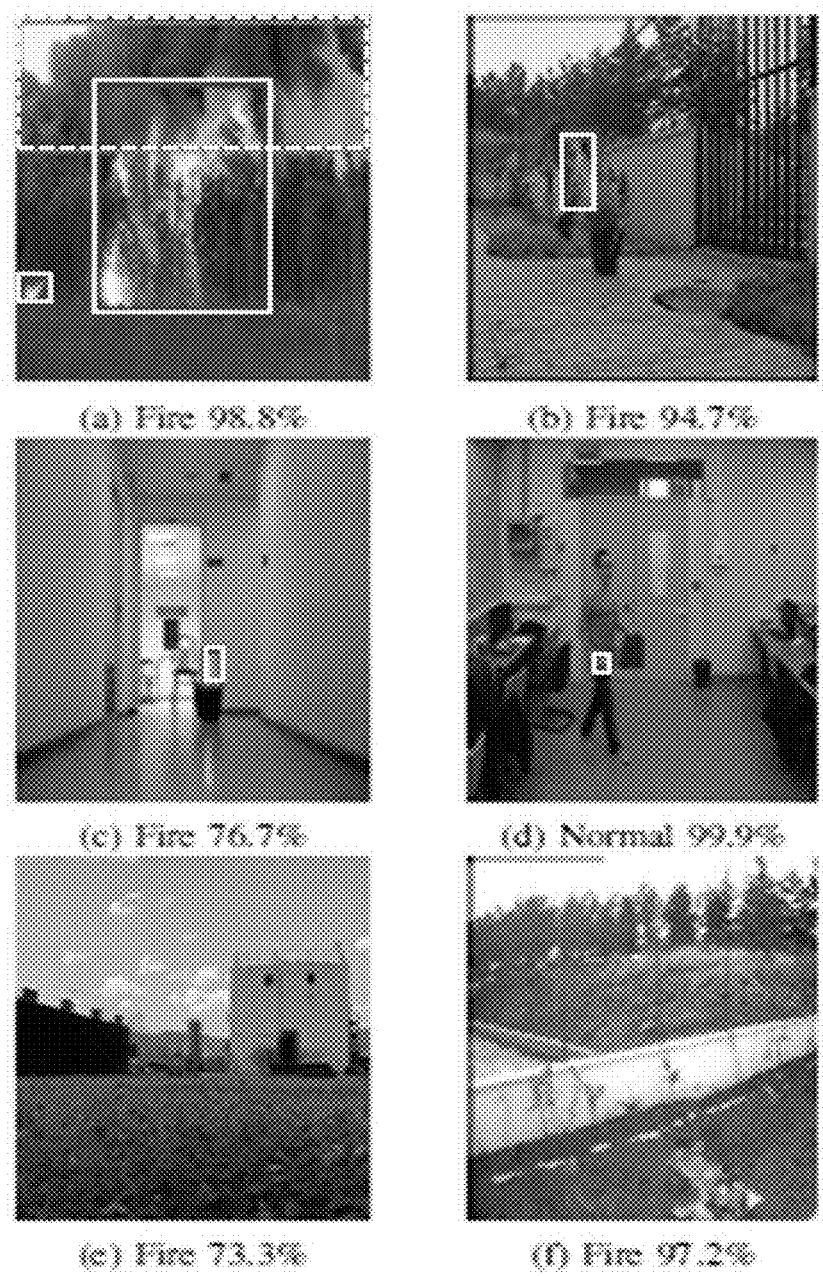
FIG. 9 depicts sample image frames from videos with the average fire prediction scores for the whole video, in accordance with some embodiments of the present disclosure.

FIG. 7 depicts true positive prediction scores with bounding boxes on fire images collected from validation dataset. FIG. 8 depicts some true negative examples of non-fire images. Image (b) shows a foggy street at night with very bright streetlamps giving lower score for 'normal'. Image (a) and image (d) of FIG. 8 has very vibrant street signs. Image (c) of FIG. 8 shows a sunset sky that appears like grey-yellow patches of fire. The fine-tuned classifier of the integrated DL model 110 has separate categories scores for smoke and fire and is trained with fire-patch images of training dataset. Hence it gives lower normal scores for fire-light sunset sky images. FIG. 9 contains sample frames from some videos of with the average prediction scores for the whole video. FIG. 10 gives some example images with false prediction outputs. In images (a) to (f) of FIG. 9 one sample image frame from some videos of Foggia video dataset is shown and below each image is the average fire score of all image frames from that video. These videos are quite challenging in terms of variations induced due to background environment, both indoors and outdoors. In FIG. 9, images (c) and (e) has larger and brighter backgrounds compared to the fire-regions. Thus, the average fire-category score is lower compared to other videos.

Figure 11:
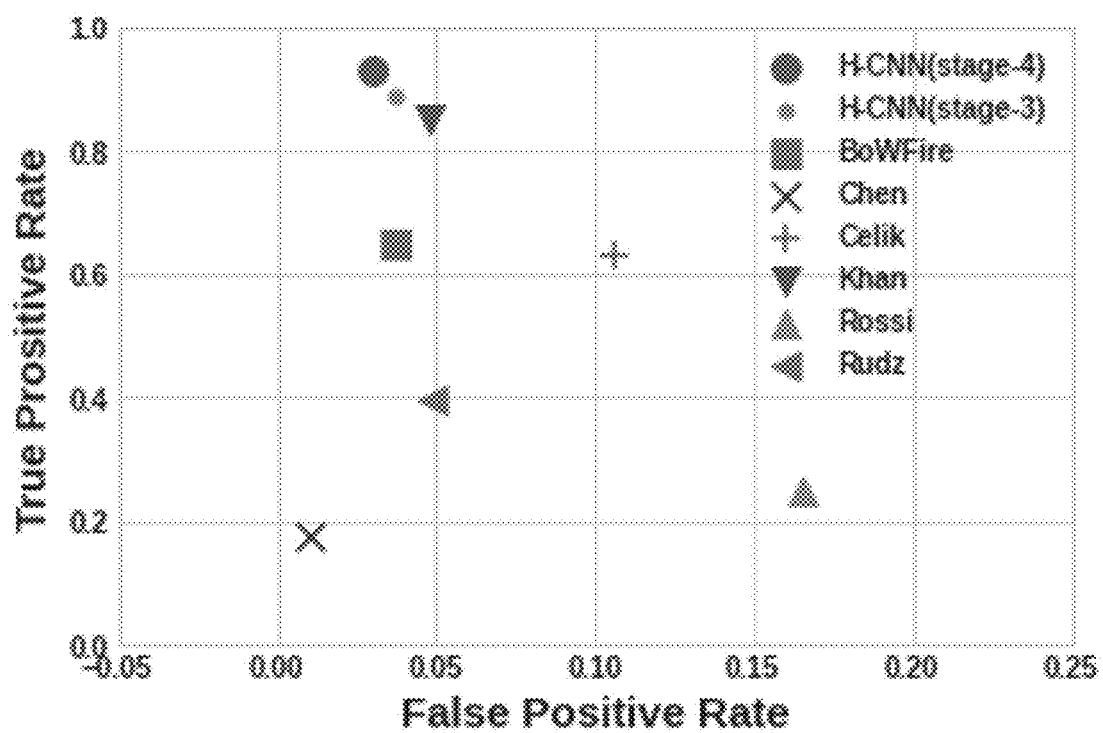
FIG. 11 is a graph depicting comparative analysis of the integrated DL model with works in literature for automated fire detection and localization, in accordance with some embodiments of the present disclosure.

FIG. 10 depicts some examples of images from causing false predictions in the system 100. Since the system 100 depends on the fire category scores from classifier module, the color patterns of images (a) and fire-arts in (b) of FIG. 10 appear like stage lights give higher and lower fire-scores respectively than required. Image (c) of FIG. 10 has a normal looking background with light smokes, resulting in low smoke score below 50% and higher normal score. The smoke images are considered as a part of the fire category in the two class classifier implementation. FIG. 11, depicts a comparison of fire-region localization of the method disclosed with those of earlier works in terms of true positive and false negative rates. This evaluation is done on fire containing images only. The other existing techniques calculate the number of overlapping and non-overlapping pixels between the detected maps and ground truth images to determine true positives and false positives, respectively.

For the method disclosed, ground truth is the box coordinates in annotation files for each image generated manually for testing purposes. To get the true positive rate the bounding-box area is calculated in localizer module output that overlaps with ground truth bounding box. False positive is the area of generated bounding-box that does not overlap with and is beyond the ground truth boundary. Table II shows the performance comparison of running MobileNetV2™, MobileNetV2™ SSD and he naive implementation that runs theMobileNetV2™ and MobileNetV2™ SSD together. Table III show how the integrated DL model 110 (CAFDL) achieves the target latency in both Jetson Nano™+NCS™ and Jetson Tx2™+NCS™ combination.

Detailed Comparison with Earlier Works: As mentioned earlier the architecture of the integrated DL model at design CAFDL A-8 gives the highest accuracy and mAP in network validation phase but CAFDL A-14 gives improved latency with some reduction of accuracy metrics. Precision is the ratio of the true positive cases to all positive cases. Recall is the ratio of the number of true positives to sum of true positives and true negatives. F-measure (F1 score) is the harmonic mean of precision and recall. Table IV shows comparisons of false positives, false negatives, accuracy and mAPs among the two design stages of the integrated DL model 110, stage 4 and 3, and earlier works on fire-detection methods, evaluated on Foggia's dataset of 31 videos. False positives for the integrated DL model 110 and that of KIM et. al is much less than other methods. For false negatives, Foggia et. al, Celik et. al and Kin et. al shows the lowest values. Among the rest, the integrated DL model 110 and Kim et. al show lower false negative values.

TABLE IV

| Methods | False positive (%) | False negative (%) | ACCURACY (%) | mAP (%) |
| --- | --- | --- | --- | --- |
| 1. Integrated DL model (CAFDL A-8) | 4.23 | 1.72 | 97.8 | 94.2 |
| 2.. Integrated DL model (CAFDL A-8) | 4.65 | 1.98 | 95.1 | 89.5 |
| 3. Kim et.al | 2.47 | 1.38 | 97.92 | — |
| 4. Khan et.al | 0 | 0.14 | 95.86 | — |
| 5. Khan et.al | 8.87 | 1.12 | 94.50 | — |
| 6. Foggia et.al | 11.67 | 0.00 | 93.55 | — |
| 7. Lascio et.al | 13.33 | 0.00 | 92.86 | — |
| 8. Chen et.al | 11.76 | 14.29 | 87.10 | — |
| 9. Rafiee et.al | 17.65 | 7.14 | 87.10 | — |
| 10. Celik et.al | 29.41 | 0.00 | 83.87 | — |
| 11. Rafiee et.al | 41.18 | 7.14 | 74.20 | — |

Table V, shows the precision, recall and F-measure value comparisons of the integrated DL model 110 architecture with the earlier works evaluated on images from BoWFire validation dataset.

TABLE V

| Methods | Precision | Recall | F-measure |
| --- | --- | --- | --- |
| 1. Integrated DL model (CAFDL A-8) | 0.91 | 0.99 | 0.95 |
| 2.. Integrated DL model (CAFDL A-8) | 0.86 | 0.96 | 0.92 |
| 3.. Khan et.al | 0.90 | 0.93 | 0.92 |
| 4.. Khan et.al | 0.86 | 0.97 | 0.91 |
| 5. Chino et.al | 0.51 | 0.65 | 0.57 |
| 6. Celik et.al | 0.55 | 0.54 | 0.54 |
| 7. Rudz et.al | 0.63 | 0.45 | 0.52 |

TABLE V-continued

| Methods | Precision | Recall | F-measure |
| --- | --- | --- | --- |
| 8. Rossi et.al | 0.39 | 0.22 | 0.28 |
| 9. Chen et. al | 0.75 | 0.15 | 0.25 |

FIG. 11 is a graph depicting a comparison of fire-region localization disclosed by the method 200 method with those of earlier works in terms of true positive and false negative rates. This evaluation is done on fire containing images only. The other techniques calculate the number of overlapping and non-overlapping pixels between the detected maps and ground truth images to determine true positives and false positives, respectively. For the method 200 and the system 100, ground truth is the box coordinates in annotation files for each image generated manually for testing purposes. To get the true positive rate the bounding-box area is calculated in localizer module output that overlaps with ground truth bounding box. False positive is the area of generated bounding-box that does not overlap with and is beyond the ground truth boundary.

Figure 12:
FIG. 12 is a view of fire scene captured by an camera mounted an edge device, in accordance with some embodiments of the present disclosure.

Comparative analysis with prior arts: Kahn et. AI ran a SqueezeNet based fire-detection system on NVIDIA GeForce GTX TITAN X(Pascal)™ with 12 GB on-board memory and Intel Core i5 CPU™ with 64 GB RAM at 20 FPS with an accuracy of 94.50% and a false positive rate of 8.87%. They based their fire region localization algorithm on three intermediate feature maps. These feature maps were selected from observing their hamming distances from ground truths. The localization algorithm generated a binary image for each input image to visualize the fire region. This process in real-time localization applications lags in terms of localization accuracy and throughput. In other work Khan et al. used a CNN-based fire detection method for uncertain IoT environment, using MobileNet V2™ with no fully-connected layers. Their method gave 34 FPS in NVIDIA TITAN X (Pascal)™ with 12 GB memory, 64 GB RAM with 95.86% accuracy and 0 false alarm rate. Lascio et al. achieves the highest accuracy of 97.92%, as given in Table IV. They introduced a short-term voting delay of 10 seconds using LSTMs to reach such higher detection accuracy. Systems providing real-time responses are not built with 10 seconds decision delay. Foggia et. al got an accuracy of 93.55% and a false positive rate of 11.67% while running their fire detection algorithm in a traditional 4 GB RAM PC and Raspberry Pi B™, giving 60 FPS in the former and 3 FPS in the latter. The high false positive value, however, can be catastrophic in real-life implementations. Lascio et. al. used a color and movement-based method, where they were able to achieve 70 FPS in a 4 GB RAM machine, getting 92.59% accuracy and 6.67% false positive rate. Another work by Habibo˘glu et al., used a SVM classifier to give 20 FPS in a dual core 2.2 GHz machine providing 90.32% accuracy and 5.88% false positive rate. In comparison to these earlier works, the two-stage cascaded AFDL (integrated DL model) achieves a balance between inference parameters e.g., accuracy, false positives, false negatives, mAPs and latency. With stage 4 of the integrated DL model, a maximum accuracy of 97.8% with 4.23% false positives, 1.72% false negatives and localization mAP of 94.2% is achieved. Table IV shows, on NVIDIA Jetson TX2™ and Intel NCS 2™ the optimized CAFDL (the integrated DL model) runs at 24 FPS, which even with the drone control and navigation processes running in background approximates to 20 FPS. On Jetson Nano™ and NCS 2™ the integrated DL model runs at 15 FPS with other processes inactive and 10 FPS with other processes active. Results in Table IV and Table V show that the CAFDL based system 100, trained and tested on a combination of fire and non-fire images, in a variety of indoor-outdoor environments, achieves high performances compared with previous works. In an example implementation the integrated DL model 110 is implemented on a Parrot BeBop 2™ Drone. FIG. 12 depicts a view of fire detected from the onboard camera of Parrot BeBop 2™ Drone with Jetson Nano™ as the base platform and NCS as accelerator. FIG. 12 shows drone view of fire objects in different setup.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for cooperative and cascaded inference on edge, the method comprising:

building, via one or more hardware processors, an integrated Deep Learning (DL) model for an edge device by stitching a first subsequence of layers of a classifier to a DL model, wherein the DL model comprises a second subsequence of layers corresponding to a shared feature extractor and a localizer, wherein the first subsequence of layers and the second subsequence of layers are split based on a) a Host Processing Elements (HPE) and b) a Guest Processing Elements (GPE), wherein the second subsequence of layers corresponding to the shared feature extractor are executed in the GPE providing low latency, and the second subsequence of layers corresponding to the localizer and the first subsequence of layers corresponding to the classifier are executed in the HPE, wherein the shared feature extractor a) extracts features from an input image to transform the input image from a spatial domain to a feature space and b) shares the extracted features to the localizer and the classifier, and wherein the localizer is triggered to localize an object in the input image only if the classifier classifies the input image as positive, indicating presence of the object in the input image; and training, via the one or more hardware processors, the integrated DL model for a cooperative cascaded inference to indicate presence of the object in the input image through a multi-decision output providing simultaneous classification and localization of the object on the edge device, wherein the localizer is triggered to localize the object in the input image only if the classifier classifies the input image as positive, indicating presence of the object in the input image, and wherein training comprises:

performing joint learning of the integrated DL model utilizing a Multitask Learning (MTL) approach, wherein the classifier learns a classification task and the localizer learns a localization task based on an integrated loss function (L) that minimizes a classifier loss function $\mathcal{L}^c$ and a localizer loss function $\mathcal{L}^{L'}$ in unison using a relative task weight parameter α.

2. The method of claim 1, wherein the method further comprises raising an alarm requesting manual intervention and indicating adjustment of camera pan-tilt-zoom (PTZ), when the classifier classifies the input image as positive, but the localizer fails to localize the object in the positively classified input image.

3. The method of claim 1, wherein the method further comprises jointly partitioning the first subsequence of layers of the classifier, and second subsequence layers corresponding to the shared feature extractor and the localizer into a) a first set of layers to be implemented in the shared feature extractor and b) a second set of layers to be implemented in the classifier and the localizer by identifying an optimal hardware software partition for implementing the integrated DL model under constraint of minimal frames per second (fps), wherein the optimal hardware software partition enables balance between the latency and the accuracy of the integrated DL model while jointly performing the classification task and the localization task.

4. The method of claim 3, wherein steps of identifying the optimal hardware software partition for jointly partitioning the first subsequence of layers of the classifier and the second subsequence layers corresponding to the shared feature extractor and the localizer into a) the first set of layers to be implemented in the shared feature extractor and b) the second set of layers to be implemented in the classifier and the localizer comprises:
   identifying an initial partition defining the first set of layers and the second set of layers based on qualitative analysis of feature maps that represent the input image in the feature space;
   training the integrated DL model, built in accordance with the initial partition, to jointly learn the classification task and the localization task based in the integrated loss function (L); and
   fine tuning the initial partition by performing layer wise partitioning of the first set of layers and the second set of layers by:
      selecting, freezing, and converting the first set of layers identified in the initial partitioning for deploying and executing in the GPE;
      re-training the second set of layers without training the first set of layers deployed on the GPE, wherein the second set of layers are retrained using an intermediate output of (i) the first set of layers and (ii) the second set of the layers; and
      determining a partition point between the first set of layers and the second set of layers by;
         exporting a plurality of partition points, and partitioned models based on different subsequences of layers, with a set of resultant accuracy and latency combinations; and
         selecting (i) an optimal configuration of accuracy and latency based on an end application requirement and (ii) a corresponding partition point among the plurality of partition points as the optimal hardware software partitioning.

5. The method of claim 1, wherein the classifier is a strong classifier as is trained on large image datasets available for training, and the localizer is a weak localizer trained on limited image dataset available for training.

6. The method of claim 1, wherein the method further comprises utilizing the trained integrated DL model on the edge device for the multi-decision output providing simultaneous classification and localization of an object in one or more test images captured by the edge device in real time applications.

7. A system for cooperative and cascaded inference on edge, the system comprising:
   a memory storing instructions;
   one or more Input/Output (I/O) interfaces; and
   one or more hardware processors coupled to the memory via the one or more I/O interfaces, wherein the one or more hardware processors are configured by the instructions to:
      build an integrated Deep Learning (DL) model for an edge device by stitching a first subsequence of layers of a classifier to a DL model, wherein the DL model comprises a second subsequence of layers corresponding to a shared feature extractor and a localizer, wherein the first subsequence of layers and the second subsequence of layers are split based on a) a Host Processing Elements (HPE) and b) a Guest Processing Elements (GPE) comprising,
         wherein the second subsequence of layers corresponding to the shared feature extractor are executed in the GPE providing low latency, and the second subsequence of layers corresponding to the localizer and the first subsequence of layers corresponding to the classifier are executed in the HPE,
         wherein the shared feature extractor a) extract features from an input image to transform the input image from a spatial domain to a feature space and b) shares the extracted features to the localizer and the classifier, and
         wherein the localizer is triggered to localize an object in the input image only if the classifier classifies the input image as positive, indicating presence of the object in the input image; and
      train the integrated DL model for a cooperative cascaded inference to indicate presence of the object in the input image through a multi-decision output with simultaneous classification and localization of the object on the edge device, wherein the localizer is triggered to localize the object in the input image only if the classifier classifies the input image as positive, indicating presence of the object in the input image, and wherein training comprises:
         performing joint learning of the integrated DL model utilizing a Multitask Learning (MTL) approach, wherein the classifier learns a classification task and the localizer learns a localization task based on an integrated loss function (L) that minimizes a classifier loss function $\mathcal{L}^c$ and a localizer loss function $\mathcal{L}^l$ in unison using a relative task weight parameter α.

8. The system of claim 7, wherein the one or more hardware processors (104) are further configured to raise an alarm requesting manual intervention and indicating adjustment of camera pan-tilt-zoom (PTZ), when the classifier classifies the input image as positive, but the localizer fails to localize the object in the positively classified input image.

9. The system of claim 7, wherein the one or more hardware processors are further configured to jointly partition the first subsequence of layers of the classifier, and the second subsequence layers corresponding to the shared feature extractor and the localizer into a) a first set of layers to be implemented in the shared feature extractor and b) a second set of layers to be implemented in the classifier and the localizer by identifying an optimal hardware software partition for implementing the integrated DL model under constraint of minimal frames per second (fps), wherein the optimal hardware software partition enables balance between the latency and the accuracy of the integrated DL model while jointly performing the classification task and the localization task.

10. The system of claim 9, wherein the one or more hardware processors are further configured to identify the optimal hardware software partition for jointly partitioning the first subsequence of layers of the classifier and the second subsequence layers corresponding to the shared feature extractor and the localizer into a) the first set of layers to be implemented in the shared feature extractor and b) the second set of layers to be implemented in the classifier and the localizer by:
identifying an initial partition defining the first set of layers and the second set of layers based on qualitative analysis of feature maps that represent the input image in the feature space;
training the integrated DL model, built in accordance with the initial partition, to jointly learn the classification task and the localization task based in the integrated loss function (L); and
fine tuning the initial partition by performing layer wise partitioning of the first set of layers and the second set of layers by:
selecting, freezing, and converting the first set of layers identified in the initial partitioning for deploying and executing in the GPE;
re-training the second set of layers without training the first set of layers deployed on the GPE, wherein the second set of layers are retrained using an intermediate output of (i) the first set of layers and (ii) the second set of the layers; and
determining a partition point between the first set of layers and the second set of layers by;
exporting a plurality of partition points, and partitioned models based on different subsequences of layers, with a set of resultant accuracy and latency combinations; and
selecting (i) an optimal configuration of accuracy and latency based on an end application requirement and (ii) a corresponding partition point among the plurality of partition points as the optimal hardware software partitioning.

11. The system of claim 7, wherein the classifier is a strong classifier as is trained on large image datasets available for training, and the localizer is a weak localizer trained on limited image dataset available for training.

12. The system of claim 7, wherein the one or more hardware processors are further configured to utilize the trained integrated DL model on the edge device for the multi-decision output providing simultaneous classification and localization of an object in one or more test images captured by the edge device in real time applications.

13. One or more non-transitory machine-readable information storage mediums comprising one or more instructions, which when executed by one or more hardware processors causes a method for co-operative and cascaded inference on an edge device using an integrated Deep Learning (DL) model, the method comprising:

building an integrated Deep Learning (DL) model for an edge device by stitching a first subsequence of layers of a classifier to a DL model, wherein the DL model comprises a second subsequence of layers corresponding to a shared feature extractor and a localizer,
wherein the first subsequence of layers and the second subsequence of layers are split based on a) a Host Processing Elements (HPE) and b) a Guest Processing Elements (GPE),
wherein the second subsequence of layers corresponding to the shared feature extractor are executed in the GPE providing low latency, and the second subsequence of layers corresponding to the localizer and the first subsequence of layers corresponding to the classifier are executed in the HPE,
wherein the shared feature extractor a) extracts features from an input image to transform the input image from a spatial domain to a feature space and b) shares the extracted features to the localizer and the classifier, and
wherein the localizer is triggered to localize an object in the input image only if the classifier classifies the input image as positive, indicating presence of the object in the input image; and
training the integrated DL model for a cooperative cascaded inference to indicate presence of the object in the input image through a multi-decision output providing simultaneous classification and localization of the object on the edge device, wherein the localizer is triggered to localize the object in the input image only if the classifier classifies the input image as positive, indicating presence of the object in the input image, and wherein training comprises:
performing joint learning of the integrated DL model utilizing a Multitask Learning (MTL) approach, wherein the classifier learns a classification task and the localizer learns a localization task based on an integrated loss function (L) that minimizes a classifier loss function $\mathcal{L}^c$ and a localizer loss function $\mathcal{L}^l$ in unison using a relative task weight parameter α.

14. The one or more non-transitory machine-readable information storage mediums of claim 13, wherein the method further comprises raising an alarm requesting manual intervention and indicating adjustment of camera pan-tilt-zoom (PTZ), when the classifier classifies the input image as positive, but the localizer fails to localize the object in the positively classified input image.

15. The one or more non-transitory machine-readable information storage mediums of claim 13, further comprise jointly partitioning the first subsequence of layers of the classifier, and second subsequence layers corresponding to the shared feature extractor and the localizer into a) a first set of layers to be implemented in the shared feature extractor and b) a second set of layers to be implemented in the classifier and the localizer by identifying an optimal hardware software partition for implementing the integrated DL model under constraint of minimal frames per second (fps), wherein the optimal hardware software partition enables balance between the latency and the accuracy of the integrated DL model while jointly performing the classification task and the localization task.

16. The one or more non-transitory machine-readable information storage mediums of claim 15, wherein steps of identifying the optimal hardware software partition for jointly partitioning the first subsequence of layers of the classifier and the second subsequence layers corresponding to the shared feature extractor and the localizer into a) the first set of layers to be implemented in the shared feature extractor and b) the second set of layers to be implemented in the classifier and the localizer comprises:
  identifying an initial partition defining the first set of layers and the second set of layers based on qualitative analysis of feature maps that represent the input image in the feature space;
  training the integrated DL model, built in accordance with the initial partition, to jointly learn the classification task and the localization task based in the integrated loss function (L); and
  fine tuning the initial partition by performing layer wise partitioning of the first set of layers and the second set of layers by:
    selecting, freezing, and converting the first set of layers identified in the initial partitioning for deploying and executing in the GPE;
    re-training the second set of layers without training the first set of layers deployed on the GPE, wherein the second set of layers are retrained using an intermediate output of (i) the first set of layers and (ii) the second set of the layers; and
    determining a partition point between the first set of layers and the second set of layers by;
      exporting a plurality of partition points, and partitioned models based on different subsequences of layers, with a set of resultant accuracy and latency combinations; and
      selecting (i) an optimal configuration of accuracy and latency based on an end application requirement and (ii) a corresponding partition point among the plurality of partition points as the optimal hardware software partitioning.

17. The one or more non-transitory machine-readable information storage mediums of claim 13, wherein the classifier is a strong classifier as is trained on large image datasets available for training, and the localizer is a weak localizer trained on limited image dataset available for training.

18. The one or more non-transitory machine-readable information storage mediums of claim 13, further comprises utilizing the trained integrated DL model on the edge device for the multi-decision output providing simultaneous classification and localization of an object in one or more test images captured by the edge device in real time applications.

* * * * *